United States Patent
Thiriet

(10) Patent No.: US 6,216,204 B1
(45) Date of Patent: Apr. 10, 2001

(54) INTEGRATED CIRCUIT CARD COMPRISING FILES CLASSIFIED IN A TREE STRUCTURE

(75) Inventor: Fabien Thiriet, Orleans (FR)

(73) Assignee: Schlumberger Systemes, Montrouge (FR)

( * ) Notice: Subject to any disclaimer, the term of this patent is extended or adjusted under 35 U.S.C. 154(b) by 0 days.

(21) Appl. No.: 09/147,491
(22) PCT Filed: Jul. 31, 1997
(86) PCT No.: PCT/FR97/01435
§ 371 Date: Jan. 8, 1999
§ 102(e) Date: Jan. 8, 1999
(87) PCT Pub. No.: WO98/06071
PCT Pub. Date: Feb. 12, 1998

(30) Foreign Application Priority Data

Aug. 1, 1996 (FR) .................................................. 96 09728

(51) Int. Cl.$^7$ ..................................................... G06F 12/02
(52) U.S. Cl. ............................... 711/115; 711/173; 707/1; 235/389; 235/492
(58) Field of Search ...................... 711/103, 115, 711/173; 235/380, 492; 707/205, 1

(56) References Cited

U.S. PATENT DOCUMENTS 4,998,009 * 3/1991 Iijma et al. ......................... 235/487
5,355,481 * 10/1994 Sluijter ..................................... 707/1
5,404,485 * 4/1995 Ban ..................................... 711/202
5,408,082   4/1995 Takagi .
5,517,014   5/1996 Iijma .
5,600,821 * 2/1997 Falik et al. ........................... 711/173

FOREIGN PATENT DOCUMENTS 9400822   1/1994  (WO) .

OTHER PUBLICATIONS

Frenger P: "MCard/FS: afile manager for memory cards" Images of the Twenty–First Century. Proceedings of the Annual International Conference of the IEEE Engineering in Medicine and Biology Society (Cat. No. 89CH2770–6), Seattle, WA, USA, Nov. 9–12, 1989, 1989, New York NY, USA, IEEE, pp. 777–778 vol. 2, XP002029716.

* cited by examiner

Primary Examiner—Hiep T. Nguyen
(74) Attorney, Agent, or Firm—Birch, Stewart, Kolasch & Birch, LLP

(57) ABSTRACT

An IC card includes card including a memory containing files classified in a tree structure of various levels, each file having an associated access path. Each file is physically located in the memory independently of its location in the virtual tree structure, and contains information specifying the full access path associated with the file.

2 Claims, 2 Drawing Sheets

Fd
N = 0
C = Ra
L
------

Fb
N = 2
C = Ra / Rb / Rc
L
------

Fc
N = 2
C = Ra / Rb / Rc
L
------

Fa
N = 1
C = Ra / Rb
L
------

Fe
N = 1
C = Ra / Rd
L
------

Ff
N = 1
C = Ra / Rd
L
------

FIG_2

INTEGRATED CIRCUIT CARD COMPRISING FILES CLASSIFIED IN A TREE STRUCTURE

The present invention relates to an integrated circuit (IC) card including a memory containing files classified in a tree structure.

BACKGROUND OF THE INVENTION

For reasons associated with communications protocol and convenience of use, the files in an IC card memory are classified in directories, themselves organized in a tree structure having various levels. A given file thus corresponds to a particular access path in the tree structure.

At present, the tree structure is implemented physically in the card memory: the directories in which the various files are stored are physically created in the memory and they are physically interleaved amongst one another in application of a tree structure created by the user.

That method of storing files with a physical tree structure suffers from two main drawbacks. Firstly it is expensive in memory space, since the directories of the tree structure exist physically within the memory and the header information they contain (identifiers, sizes, pointers, etc. . . . ) occupies memory space that cannot be used for storing files. Secondly, the operations of adding, deleting, extending, or reducing a file require physical modification to the tree structure in the memory. Such modification assumes that the chaining pointers of the tree structure are updated dynamically. This updating gives rise not only to a loss of time, but also to insecurity, in the event of the card being pulled out while updating is taking place, in which case there is a risk that the operating system will no longer be able to reestablish a coherent tree structure in the card memory.

OBJECT AND SUMMARY OF THE INVENTION

According to the invention, an IC card is proposed including a memory containing files classified in a tree structure having various levels, each file having an associated access path, in which each file is physically located in the memory independently of its location in the virtual tree structure, and contains information specifying the full access path associated with the file.

Thus, the card memory no longer has a physical tree structure. Nevertheless, the access path contained in each file makes it possible, a posteriori, to reconstitute the tree structure in which the various files are classified for the needs of communications protocol or for convenience of use.

The absence of a physical tree structure facilitates and makes secure the operations of adding, deleting, extending, or reducing files. For example, a file is added merely by writing the file in memory after files that already exist, or in any available memory block. Similarly, deleting a file does not necessarily require existing files to be moved. If the card is pulled out while such operations are taking place, the access path of each file is not damaged in any way, and the operating system will be capable of accessing the various files in the future without any particular difficulty, with only the file that was in the process of being modified at the time the card was pulled out running any risk of being affected.

Advantageously, each file contains information specifying the level of its location in the tree structure. Thus, when the operating system is looking for a file at a given level, it is possible for it to examine the access paths only of those files at the same level as the looked-for file. File searching is thus accelerated.

BRIEF DESCRIPTION OF THE DRAWINGS

Other characteristics and advantages of the invention appear on reading the following description of an implementation of the invention.

Reference is made to the accompanying drawings, in which:

FIG. 2 is a diagram showing a memory in which files are organized in a virtual tree structure using the method of the invention for organizing files.

MORE DETAILED DESCRIPTION

Figure 1:
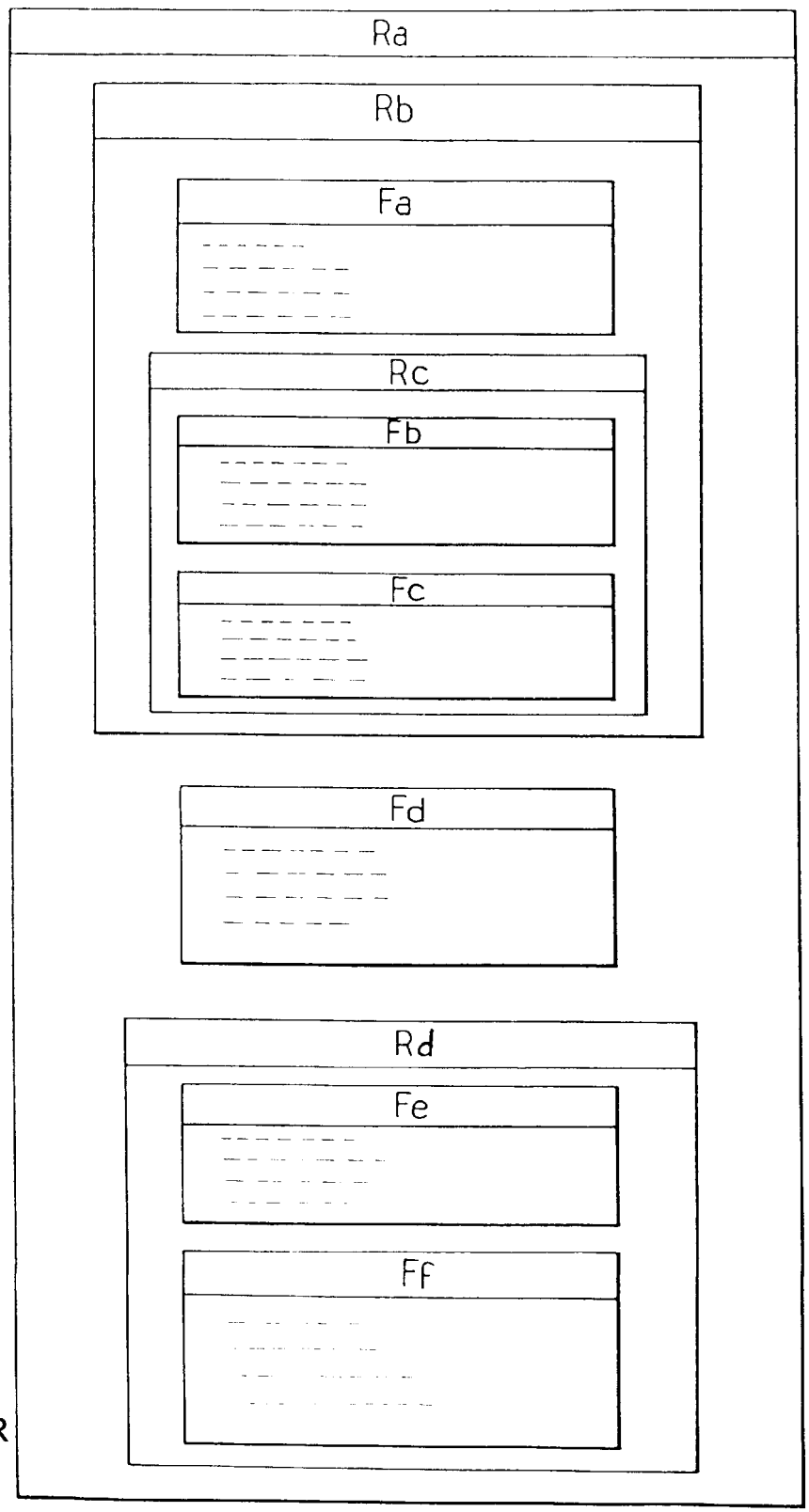
FIG. 1 is a diagram showing a memory in which files are organized in a physical tree structure having various levels, using the prior art method of organization.

FIG. 1 shows an IC card memory in which files are organized using the known method having a physical tree structure. Files Fa to Ff are physically stored in directories Ra to Rd organized in the memory in a tree structure determined by the user.

Specifically, directory Ra which is the root directory at level 0 contains directories Rb and Rd and also file Fd. The directories Rb and Rd, and the file Fd are thus at level 1.

The directory Rb contains file Fa and directory Rc both of which are at level 2. Directory Rc itself contains files Fb and Fc, both at level 3.

Directory Rd contains files Fe and Ff, both at level 2.

It will be understood that the diagram of FIG. 1 shows the physical locations in the memory of the IC card of the files and of the directories containing them.

FIG. 2 shows an IC card memory in which files are organized in accordance with the invention. For better understanding, the same files Fa to Ff of FIG. 1 are shown again, organized in the same tree structure, with each file conserving its own access path, however the tree structure is now virtual.

Contrary to the known organization of FIG. 1, the organization of the invention consists in storing each file physically in the memory of the IC card independently of its location in the tree structure (which is thus virtual), and in so doing, this organization eliminates any physical directory. The virtual file classification in the tree structure created by the user is implemented by each file specifying its own access path C in the virtual tree structure. Thus, given the name of a file and its access path, the operating system scans through the memory, exploring the file headers until it finds the file having the specified name and access path. The tree structure can be recomputed dynamically whenever necessary: the operating system scans the headers of all of the files and, on the basis of the access path found for each file, it reconstitutes the tree structure in which the files are classified in the memory.

Each file header includes not only the file name and its access path in the tree structure, but also additional information such as the length of the file, the type of the file, access conditions, etc. In this case, the file header also includes level information marked "N", specifying the level of the file in the tree structure. This information enables the operating system, when searching for a file or when dynamically recomputing the tree structure, to obtain the level of the file in the tree structure directly without needing to inspect its access path. This not only facilitates and accelerates operations, but also makes them more reliable since the information redundancy makes it possible to detect possible write or read errors.

The order in which files are stored in the memory is of no consequence, as can be seen from the positions of the blocks shown in FIG. 2, where file Fd is located at the head of the memory, while file Fa is located in fourth position. Thus, when a file is to be added, it suffices to store it after the files that are already in place, without any need to move those files.

When a file is extended, it suffices to shift the files situated after the file that is to be extended on a block by block basis, and then to change the length information of the extended file, or more simply it suffices merely to relocate that file into a block that has sufficient room. The opposite operation is performed if a file is shortened or deleted.

In the invention, it can thus be seen that files are no longer stored in the form of a tree structure, but in arbitrary form one after another. A virtual tree structure can be reconstituted a posteriori. Similarly, directories have no physical existence in the memory, but exist virtually merely by the fact that they are mentioned in the access paths of the various files. A particular result of this is that a directory is deleted by deleting all of the files containing that directory in their access paths.

Specifically, file Fa which is situated in directory Rb of the virtual tree structure contains the information N=1 in its header specifying its level in the virtual tree structure, and the information C=Ra/Rb giving its access path, meaning that the file Fa is to be found (virtually) in (virtual) directory Rb which is itself to be found in (virtual) directory Ra. The header of file Fa also contains other information such as the length L of the file.

Similar information is contained in the headers of the other files. Thus, files Fb and Fc which are situated in the same virtual directory Rc have the same level N=2 and the same access path C=Ra/Rb/Rc. File Fd which is situated in the virtual root directory Ra is at level N=0 and its access path is C=Ra. Files Fe and Ff are both situated in (virtual) directory Rd, and both have the same level N=1 and the same access path C=Ra/Rd.

The invention is not limited to the embodiment described above, but on the contrary covers any variant using equivalent means to reproduce the essential characteristics of the invention.

What is claimed is:

1. An IC card including a memory containing files classified in a tree structure of various levels, each file having an associated access path determining a position of said file in said structure irrespective of a physical location of said file in said memory, and containing information specifying the full access path giving the exact position of said file in said tree structure.

2. The IC card of claim 1, wherein each file contains information specifying the level of its location in the tree structure.

* * * * *